US012032523B2

(12) United States Patent
Wu et al.

(10) Patent No.: US 12,032,523 B2
(45) Date of Patent: Jul. 9, 2024

(54) COMPRESSED SENSING USING NEURAL NETWORKS

(71) Applicant: DeepMind Technologies Limited, London (GB)

(72) Inventors: Yan Wu, St. Albans (GB); Timothy Paul Lillicrap, London (GB); Mihaela Rosca, London (GB)

(73) Assignee: DeepMind Technologies Limited, London (GB)

( * ) Notice: Subject to any disclaimer, the term of this patent is extended or adjusted under 35 U.S.C. 154(b) by 438 days.

(21) Appl. No.: 16/818,895

(22) Filed: Mar. 13, 2020

(65) Prior Publication Data

US 2020/0293497 A1 Sep. 17, 2020

Related U.S. Application Data

(60) Provisional application No. 62/817,979, filed on Mar. 13, 2019.

(51) Int. Cl.
*G06F 16/174* (2019.01)
*G06N 3/045* (2023.01)
*G06N 3/08* (2023.01)

(52) U.S. Cl.
CPC ......... *G06F 16/1744* (2019.01); *G06N 3/045* (2023.01); *G06N 3/08* (2013.01)

(58) Field of Classification Search
CPC .... G06F 16/1744; G06N 3/0454; G06N 3/08; G06N 3/0472; G06N 3/084
See application file for complete search history.

(56) References Cited

U.S. PATENT DOCUMENTS 10,387,765 B2 * 8/2019 Mailhe .................... G06T 5/001
10,846,889 B2 * 11/2020 Phogat ................... G06V 10/82
(Continued)

FOREIGN PATENT DOCUMENTS

CN 105868829 8/2016
CN 108171762 6/2018
(Continued)

OTHER PUBLICATIONS

Salloum, Maher, et al. "Optimal compressed sensing and reconstruction of unstructured mesh datasets." Data Science and Engineering 3.1 (2018): 1-23. (Year: 2018).*
(Continued)

*Primary Examiner* — Andrae S Allison
(74) *Attorney, Agent, or Firm* — Fish & Richardson P.C.

(57) ABSTRACT

Methods, systems, and apparatus, including computer programs encoded on computer storage media, for compressed sensing using neural networks. One of the methods includes receiving an input measurement of an input data item; for each of one or more optimization steps: processing a latent representation using a generator neural network to generate a candidate reconstructed data item, processing the candidate reconstructed data item using a measurement neural network to generate a measurement of the candidate reconstructed data item, and updating the latent representation to reduce an error between the measurement and the input measurement; and processing the latent representation after the one or more optimization steps using the generator neural network to generate a reconstruction of the input data item.

25 Claims, 3 Drawing Sheets

(56) References Cited

U.S. PATENT DOCUMENTS

| | | | |
|---|---|---|---|
| 10,909,416 B2* | 2/2021 | Mansi | G06N 3/084 |
| 10,924,755 B2* | 2/2021 | Ren | G06N 3/0454 |
| 11,126,895 B2* | 9/2021 | Anirudh | G06N 3/0472 |
| 11,151,456 B1* | 10/2021 | Sughrue | A61B 5/055 |
| 2016/0232440 A1 | 8/2016 | Gregor et al. | |
| 2018/0173994 A1* | 6/2018 | Rippel | G06V 30/19167 |
| 2018/0174047 A1 | 6/2018 | Bourdev et al. | |
| 2018/0176576 A1* | 6/2018 | Rippel | G06V 40/172 |
| 2018/0176578 A1* | 6/2018 | Rippel | G06N 3/08 |
| 2018/0336472 A1 | 11/2018 | Ravi | |
| 2020/0234406 A1* | 7/2020 | Ren | G06T 5/001 |
| 2020/0334534 A1* | 10/2020 | Rippel | G06N 3/08 |
| 2020/0372370 A1* | 11/2020 | Donahue | G06N 3/0472 |
| 2021/0089909 A1* | 3/2021 | Binkowski | G10L 25/30 |
| 2021/0150807 A1* | 5/2021 | Zhou | G06T 19/20 |

FOREIGN PATENT DOCUMENTS

| | | |
|---|---|---|
| CN | 109074512 | 12/2018 |
| CN | 109074517 | 12/2018 |
| CN | 109155003 | 1/2019 |

OTHER PUBLICATIONS

Quan, Tran Minh, Thanh Nguyen-Duc, and Won-Ki Jeong. "Compressed sensing MRI reconstruction using a generative adversarial network with a cyclic loss." IEEE transactions on medical imaging 37.6 (2018): 1488-1497. (Year: 2018).*

Thomas Wolf, From zero to research—an introduction to Meta-learning, Apr. 3, 2018, https://medium.com/huggingface/from-zero-to-research-an-introduction-to-meta-learning-8e16e677f78a (Year: 2018).*

Dave, Akshat, Anil Kumar Vadathya, and Kaushik Mitra. "Compressive image recovery using recurrent generative model." 2017 IEEE International Conference on Image Processing (ICIP). IEEE, 2017. (Year: 2017).*

Dora, Shirin, Cyriel Pennartz, and Sander Bohte. "A deep predictive coding network for learning latent representations." BioRxiv (Mar. 2018): 278218. (Year: 2018).*

Arjovsky et al., "Wasserstein GAN," https://arxiv.org/abs/1701.07875v3, last revised Dec. 2017, 32 pages.

Azadi et al., "Discriminator Rejection Sampling," https://arxiv.org/abs/1810.06758v3, last revised Feb. 2019, 16 pages.

Balduzzi et al. "The Mechanics of n-Player Differentiable Games," https://arxiv.org/abs/1802.05642v2, last revised Jun. 2018, 17 pages.

Baraniuk, "Compressive Sensing [Lecture Notes]," IEEE Signal Processing Magazine, Jul. 2007, 24(4):4 pages.

Bojanowski et al., "Optimizing the Latent Space of Generative Networks," Proceedings of the 35th International Conference on Machine Learning, retrieved from URL <http://proceedings.mlr.press/v80/bojanowski18a/bojanowski18a.pdf>, Jul. 2018, 10 pages.

Bora et al., "Compressed Sensing using Generative Models," https://arxiv.org/abs/1703.03208, Mar. 2017, 24 pages.

Bourlard et al., "Auto-association by multilayer perceptrons and singular value decomposition," Biological Cybernetics, Sep. 1988, 59(4-5):291-294.

Brock et al., "Large Scale GAN Training for High Fidelity Natural Image Synthesis," International Conference on Learning Representations, retrieved from URL <https://openreview.net/forum?id=B1xsqj09Fm>, Feb. 2019, 35 pages.

Candes et al., "Stable Signal Recovery from Incomplete and Inaccurate Measurements," Communications on Pure and Applied Mathematics: A Journal Issued by the Courant Institute of Mathematical Sciences, Aug. 2006, 59(8):1207-1223.

Dhar et al., "Modeling Sparse Deviations for Compressed Sensing using Generative Models," https://arxiv.org/abs/1807.01442v2, Jul. 2018, 16 pages.

Donoho, "Compressed Sensing," IEEE Transactions on Information Theory, Apr. 2006, 52(4):1289-1306.

Duarte et al., "Single-pixel imaging via compressive sampling," IEEE Signal Processing Magazine, Mar. 2008, 25(2):83-91.

Finn et al., "Model-Agnostic Meta-Learning for Fast Adaptation of Deep Networks," https://arxiv.org/abs/1703.03400v3, last revised Jul. 2017, 13 pages.

Goodfellow et al., "Generative Adversarial Nets," Advances in Neural Information Processing Systems 27 (NIPS 2014), 2014, 9 pages.

Grover et al., "Uncertainty Autoencoders: Learning Compressed Representations via Variational Information Maximization," https://arxiv.org/abs/1812.10539v1, Dec. 2018, 19 pages.

Hand et al., "Global Guarantees for Enforcing Deep Generative Priors by Empirical Risk," https://arxiv.org/abs/1705.07576v1, May 2017, 31 pages.

Heusel et al., "GANs Trained by a Two Time-Scale Update Rule Converge to a Local Nash Equilibrium," Advances in Neural Information Processing Systems 30 (NIPS 2017), Dec. 2017, 12 pages.

Hotelling, "Analysis of a complex of statistical variables into principal components," Journal of Educational Psychology, 1933, 24(6):417-441.

Hu et al., "On Unifying Deep Generative Models," International Conference on Learning Representations, retrieved from URL <https://openreview.net/forum?id=ry1SzI-R->, Feb. 2018, 19 pages.

Ioffe et al., "Batch Normalization: Accelerating Deep Network Training by Reducing Internal Covariate Shift," https://arxiv.org/abs/1502.03167v3, last revised Mar. 2015, 11 pages.

Johnson et al., "Extensions of Lipschitz Mappings into a Hilbert Space," Contemporary Mathematics, 1984, 26: 189-206.

Kingma et al., "Adam: A Method for Stochastic Optimization," https://arxiv.org/abs/1412.6980v1, Dec. 2014, 9 pages.

Kingma et al., "Auto-Encoding Variational Bayes," https://arxiv.org/abs/1312.6114v1, Dec. 2013, 9 pages.

Krizhevsky, "Learning Multiple Layers of Features from Tiny Images," Technical Report, Citeseer, Apr. 2009, 60 pages.

Kulkarni et al., "ReconNet: Non-Iterative Reconstruction of Images from Compressively Sensed Measurements," 2016 IEEE Conference on Computer Vision and Pattern Recognition (CVPR), Jun. 2016, 449-458.

Kurach et al., "The GAN Landscape: Losses, Architectures, Regularization, and Normalization," https://arxiv.org/abs/1807.04720v1, Jul. 2018, 16 pages.

Liu et al., "Deep Learning Face Attributes in the Wild," 2015 IEEE International Conference on Computer Vision (ICCV), Dec. 2015, 3730-3738.

Lu et al., "ConvCSNet: A Convolutional Compressive Sensing Framework Based on Deep Learning," https://arxiv.org/abs/1801.10342, Jan. 2018, 7 pages.

Lustig et al., "Sparse MRI: The application of compressed sensing for rapid MR imaging," Magnetic Resonance in Medicine: An Official Journal of the International Society for Magnetic Resonance in Medicine, Oct. 2007, 58(6):1182-1195.

Maaten et al., "Visualizing Data using t-SNE," Journal of Machine Learning Research, Nov. 2008, 2579-2605.

Mao et al., "Least Squares Generative Adversarial Networks," 2017 IEEE International Conference on Computer Vision (ICCV), Oct. 2017, 2813-2821.

Metzler et al., "Learned D-AMP: Principled Neural Network based Compressive Image Recovery," Advances in Neural Information Processing Systems 30 (NIPS 2017), 2017, 12 pages.

Mirza et al., "Conditional Generative Adversarial Nets," https://arxiv.org/abs/1411.1784, Nov. 2014, 7 pages.

Miyato et al., "cGANs with Projection Discriminator," https://arxiv.org/abs/1802.05637v2, last revised Aug. 2018, 21 pages.

Miyato et al., "Spectral Normalization for Generative Adversarial Networks," International Conference on Learning Representations, retrieved from URL <https://openreview.net/forum?id=B1QRgziT->, Feb. 2018, 26 pages.

Mohamed et al., "Learning in Implicit Generative Models," https://arxiv.org/abs/1610.03483v1, Oct. 2016, 8 pages.

Mousavi et al., "A Data-Driven and Distributed Approach to Sparse Signal Representation and Recovery," International Conference on (56) References Cited

OTHER PUBLICATIONS

Learning Representations, retrieved from URL <https://openreview.net/forum?id=B1xVTjCqKQ&noteId=BJITjLcgIV>, Sep. 2018, 13 pages.

Mousavi et al., "A deep learning approach to structured signal recovery," 2015 53rd Annual Allerton Conference on Communication, Control, and Computing (Allerton), Sep. 2015, 1336-1343.

Mousavi et al., "DeepCodec: Adaptive Sensing and Recovery via Deep Convolutional Neural Networks," https://arxiv.org/abs/1707.03386, Jul. 2017, 8 pages.

Odena et al., "Conditional Image Synthesis with Auxiliary Classifier GANs," Proceedings of the 34th International Conference on Machine Learning, Aug. 2017, 10 pages.

Radford et al., "Unsupervised Representation Learning with Deep Convolutional Generative Adversarial Networks," https://arxiv.org/abs/1511.06434v1, Nov. 2015, 15 pages.

Rezende et al., "Stochastic Backpropagation and Approximate Inference in Deep Generative Models," https://arxiv.org/abs/1401.4082v3, last revised May 2014, 14 pages.

Salimans et al., "Improved Techniques for Training GANs," Advances in Neural Information Processing Systems 29 (NIPS 2016), 2016, 9 pages.

Schlegl et al., "Unsupervised Anomaly Detection with Generative Adversarial Networks to Guide Marker Discovery," International Conference on Information Processing in Medical Imaging, May 2017, 146-157.

Schmidhuber, "Evolutionary Principles in Self-Referential Learning (Diploma Thesis)," PhD thesis, Technische Universitat Munchen, retrieved from URL <http://people.idsia.ch/~juergen/diploma1987ocr.pdf>, May 1987, 64 pages.

Tao et al., "Chi-square Generative Adversarial Network," Proceedings of the 35th International Conference on Machine Learning, Jul. 2018, 10 pages.

Tibshirani, "Regression Shrinkage and Selection via the Lasso," Journal of the Royal Statistical Society: Series B (Methodological), 1996, 267-288.

Weiss et al., "Learning Compressed Sensing," Snowbird Learning Workshop, retrieved from URL <http://citeseerx.ist.psu.edu/viewdoc/download?doi=10.1.1.447.6824&rep=rep1&type=pdf>, Sep. 2007, 7 pages.

Williams et al., "A Learning Algorithm for Continually Running Fully Recurrent Neural Networks," Neural Computation, Jun. 1989, 1:270-280.

Yang et al., "Deep ADMM-Net for Compressive Sensing MRI," Advances in Neural Information Processing Systems 29 (NIPS 2016), 2016, 9 pages.

Zhu et al., "Unpaired Image-to-Image Translation using Cycle-Consistent Adversarial Networks," https://arxiv.org/abs/1703.10593v1, Mar. 2017, 18 pages.

PCT International Search Report and Written Opinion in International Appln. No. PCT/EP2020/056601, dated Jun. 16, 2020, 14 pages.

International Preliminary Report on Patentability in International Appln. No. PCT/EP2020/056601, dated Sep. 23, 2021, 9 pages.

Office Action in European Appln. No. 20711139.4, dated Jul. 4, 2023, 6 pages.

Office Action in Chinese Appln. No. 202080018269.6, dated Sep. 6, 2023, 20 pages (with English translation).

Office Action in Chinese Appln. No. 202080018269.6, dated Apr. 25, 2024, 24 pages (with English translation).

* cited by examiner

COMPRESSED SENSING USING NEURAL NETWORKS

CROSS-REFERENCE TO RELATED APPLICATION

This application claims priority to U.S. Provisional Application No. 62/817,979, filed on Mar. 13, 2019. The disclosure of the prior application is considered part of and is incorporated by reference in the disclosure of this application.

BACKGROUND

This specification relates to compressing and reconstructing data using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of weights.

SUMMARY

This specification describes a system implemented as computer programs on one or more computers in one or more locations that compresses and reconstructs, i.e., decompresses, data items using deep compressed sensing. The reconstruction scheme is referred to as a deep compressed sensing scheme because it makes use of a generator neural network and a measurement function (which can also be a neural network) to optimize a reconstruction of a data item over one or more optimization steps.

There is therefore described a method of reconstructing a data item, e.g. a compressed or sensed data item. The method comprises receiving an input measurement of an input data item, wherein the input measurement of the input data item is a representation of at least one characteristic of the input data item and wherein the input measurement has a lower dimensionality than the input data item; and initializing a latent representation, wherein the latent representation has a lower dimensionality than the input data item. The method further comprises, for each of one or more optimization steps: processing the latent representation using a generator neural network having a plurality of generator parameters, wherein the generator neural network is configured to process the latent representation in accordance with current values of the generator parameters to generate a candidate reconstructed data item, processing the candidate reconstructed data item using a measurement neural network having a plurality of measurement parameters, wherein the measurement neural network is configured to process the candidate reconstructed data item in accordance with current values of the measurement parameters to generate a measurement of the candidate reconstructed data item, and updating the latent representation to reduce an error between the measurement of the candidate reconstructed data item and the input measurement of the input data item; and processing the latent representation after the one or more optimization steps using the generator neural network and in accordance with the current values of the generator parameters to generate a reconstruction of the input data item.

Compressed sensing typically relies on the sparsity of a data item such as an image, to be able to reconstruct the data item with a few measurements, using an approach which guarantees minimizing a measurement error under a sparsity constraint. The sparsity may be implicit e.g. in the frequency domain, but the sparsity requirement is a significant restriction. Implementations of the described methods address this using a generator neural network, which implicitly constrains the reconstructed data item to a low-dimensional manifold, and a measurement neural network which is able to learn which aspects of the data item are useful for the reconstruction. The measurement neural network can therefore also act as an encoder to compress a data item, although when used to reconstruct a data item it processes the candidate reconstructed data item. Updating the latent representation when generating the reconstruction facilitates the reconstruction process.

As described later, there is no special architecture which needs to be used for the generator neural network and for the measurement neural network.

Initializing the latent representation may comprise randomly selecting a latent representation. The number of optimization steps in the one or more optimization steps may be a fixed constant. In some implementations of the method the number of optimization steps may be small e.g. less than ten, e.g. 3-5. Updating the latent representation may comprise performing a gradient descent step with respect to the latent representation on the error.

In implementations the generator neural network and the measurement neural network have been trained jointly by back-propagating through the one or more optimization steps to determine the current values of the generator parameters and the measurement parameters. The error between the measurement of the candidate reconstructed data item and the input measurement depends on the generator parameters and measurement parameters; back-propagating through the optimization steps may comprise adjusting these parameters. Thus the generator neural network and the measurement neural network may have been trained using meta-learning. This can provide a substantial reduction in the processing needed to reconstruct the data item, and helps to achieve a reconstruction of higher accuracy.

When reconstructing data the (online) optimization steps may include determining an update to the current values of the generator parameters by determining a gradient of the error with respect to the generator parameters. That is, the generator parameters as well as the latent representation may be adjusted to generate the reconstruction of the data item. This also helps to reduce the processing required and can increase the reconstruction accuracy.

There is no need to update the measurement parameters, and in principle the technique can even be used with random measurements. However in some implementations the measurement parameters may be updated by similarly determining a gradient of a measurement loss function with respect to the measurement parameters.

The gradient of the measurement loss function may also be determined with respect to the generator parameters and may be used in combination with the gradient of the error with respect to the generator parameters to update the current values of the generator parameters.

In implementations the measurement loss measures, for a pair of data items, a difference between: (i) a norm of a measurement of a difference between the two data items in the pair and (ii) a norm of the difference between the two data items in the pair. This form of measurement loss can help maintain the stability of the process during the optimization steps.

In some implementations the input measurement of the input data item has been generated by processing the input data item using the measurement neural network and in accordance with the current values of the measurement parameters. Thus in these implementations the measurement neural network acts as a data encoder or compressor to compress the input data item into the form of a measurement made on the input data item. In other implementations the input measurement may be obtained by sampling data directly or indirectly derived from one or more sensors e.g. one or more electrical, magnetic or optical sensors. Then the input data item may be considered to be a data item represented by, and to be reconstructed from, the data from the sensor(s).

In general the input data item may be a tensor having a first number of elements and wherein the input measurement may be a tensor having a second, (much) lower number of elements. The input measurement may be stored e.g. on disk or in other non-volatile memory, or transmitted e.g. via one or more wired or wireless communication links; then correspondingly retrieved, or received, and the input data item reconstructed as described.

The input data item may in general comprise any sort of data; implementations of the method can learn to reconstruct different types of data item. Merely by way of example the input data item may comprise an audio data item, an image data item (which here includes a video data item), or a data derived from one or more electrical, magnetic or optical sensors.

In some implementations the method is used for generating rather than decompressing a data item e.g. a data item from a distribution which reflects a training data set. In such implementations the input measurement may encode a likelihood that the input data item has been generated by the generator neural network instead of being a real input data item. Alternatively the input measurement may comprise, for each of a plurality of classes, a score representing a likelihood that the input data item belongs to the class. The plurality of classes may include a class that includes only data items generated by the generator neural network. As before, a generated data item may comprise an audio data item e.g. representing speech, or an image data item.

Particular embodiments of the subject matter described in this specification can be implemented so as to realize one or more of the following advantages.

The described techniques allow for high-dimensional data items, e.g., large images, to be compressed and reconstructed in a very data efficient manner while ensuring high reconstruction quality. In particular, a high-dimensional input can be effectively reconstructed from a single low-dimensional measurement. The low-dimensional measurement can be generated from the high-dimensional input in a single forward pass through a measurement neural network. By making use of a measurement neural network and a generator neural network during the reconstruction process, the reconstruction process can generate a high quality reconstruction with a greatly reduced computational budget, consuming fewer computational resources than conventional compressed sensing techniques. In particular, other techniques that employ compressed sensing may require hundreds or thousands of optimization steps and several re-starts during reconstruction to achieve a high-quality reconstruction while the described techniques can achieve a high-quality reconstruction in less than ten steps and without any re-starts.

When used to generate data items, the described techniques can generate higher-quality data items than conventional adversarial generation techniques with minimal additional overhead, i.e., with a fixed number of optimization steps that are performed in the latent space and are therefore computationally efficient.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
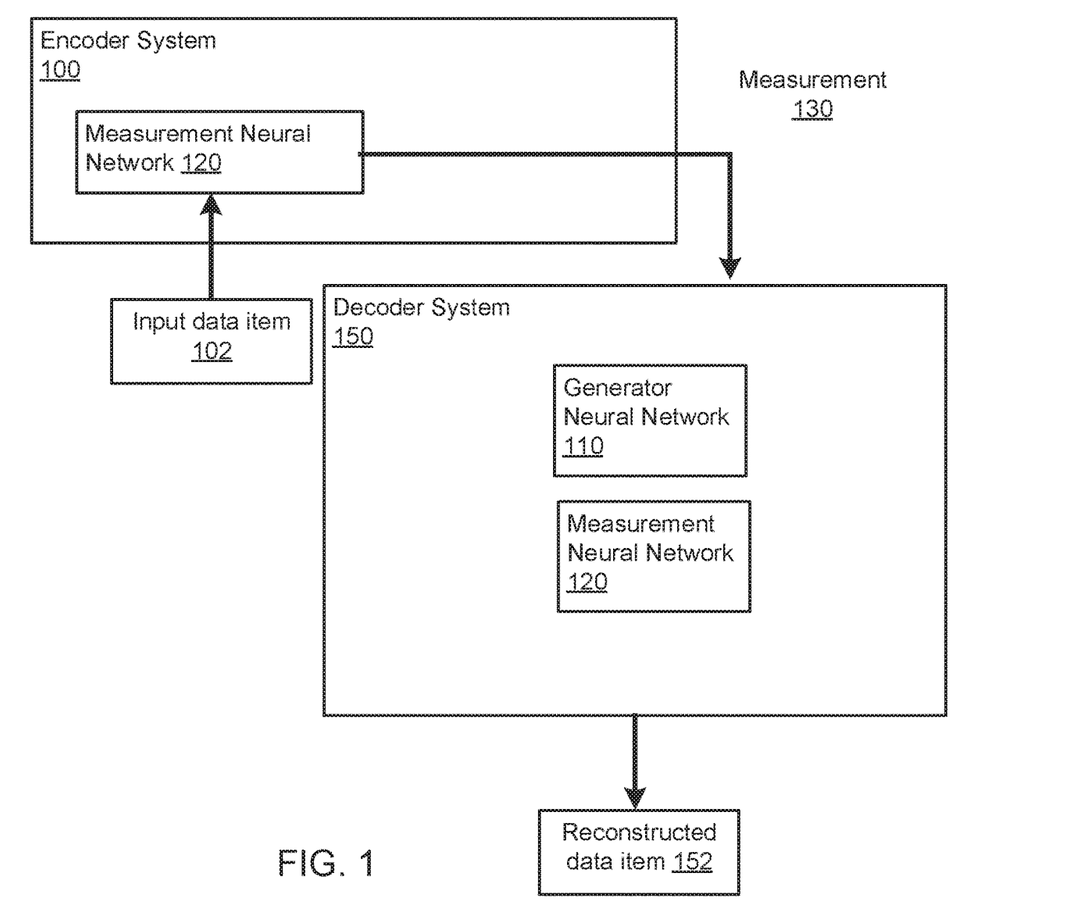
FIG. 1 shows an example encoder system and an example decoder system.

FIG. 1 shows an example encoder system 100 and an example decoder system 150. The encoder system 100 and decoder system 150 are examples of systems implemented as computer programs on one or more computers in one or more locations, in which the systems, components, and techniques described below can be implemented.

Generally, the encoder system 100 and decoder system 150 compress and reconstruct, i.e., decompress, data items using deep compressed sensing. The reconstruction scheme is referred to as a deep compressed sensing scheme because it makes use of a generator neural network 110 and a measurement function (which can also be a neural network 120) to optimize a reconstruction 152 of a data item 102 over one or more optimization steps.

The encoder 100 and the decoder 150 can operate on any of a variety of different types of data items 102, e.g., images, videos, audio signals, and so on. As a particular example, the described systems may be particularly effective for compressing high-dimensional (and therefore large) data items in a highly data efficient manner. For example, the described systems can be used to compress and reconstruct medical images, e.g., Magnetic resonance images (Mills), in a highly data efficient manner.

In particular, the encoder system 100 can compress a data item 102 by generating a measurement 130 of the data item.

The encoder system 100 can then store the measurement 130 as a compressed representation of the data item 102. When the data item 102 needs to be reconstructed, the encoder system can provide the measurement 130 of the data item to the decoder system 150, which generates the reconstruction 152 of the data item 102 from the measurement 130.

Generally, the measurement 130 is a tensor that has much lower dimensionality than the original data item 102 and therefore can be stored and transmitted with a much lower computational cost. For example, if the input data item 102 is an image that includes over 1000 intensity values, the measurement 130 may include only 25 or 50 numeric values, e.g., be a 25 or 50 dimensional vector.

In some implementations, the encoder system 100 and the decoder system 150 are implemented on one or more computers that share access to the same memory or data storage. In these implementations, the encoder system 100 can store the measurement 130 in memory or data storage accessible to the decoder system 150 and the decoder system 150 can retrieve the measurement 130 when the data item 102 needs to be reconstructed.

In some other implementations, the encoder system 100 and the decoder system 150 are implemented on computers that are remote from one another. In these implementations, the encoder system 100 can transmit the measurement 130 over a data communication network, e.g., the Internet, for reconstruction by the decoder system 150.

To reconstruct a compressed data item 102 from the input measurement 130, the decoder system 150 initializes a latent representation. The latent representation is a representation in a pre-determined space that has a lower dimensionality than the original data item 102. For example, when the input data item 102 is an image as described above, the latent representation may be a vector that has 100 dimensions. Thus, the latent representation may have a larger dimensionality than the measurement 130 but still have a much lower dimensionality than the input data item 102.

The decoder system 150 then performs one or more optimization steps to update the latent representation.

At each optimization step, the decoder system 150 processes the latent representation (as of the optimization step) using the generator neural network 110.

The generator neural network 110 is a neural network that has parameters (referred to as "generator parameters") and that is configured to process the latent representation in accordance with current values of the generator parameters to generate a candidate reconstructed data item, i.e., to map the latent representation to a candidate data item that has the same dimensionality as the data item 102.

The generator neural network 110 can have any architecture that allows the neural network to map an input in the latent representation space to an output that has the same dimensionality as the data item. For example, when the data items are images, the generator neural network 110 can be a convolutional neural network that maps the latent representation to an output image. As another example, when the data items are images, the generator neural network 110 can be a multi-layer perceptron (MLP) that maps the latent representation to a sequence of intensity values that represent the output image. As another example, when the data items are audio data, the generator neural network 110 can be a convolutional neural network with one-dimensional convolutions or an MLP that maps the latent representation to a sequence of amplitude values or a sequence of compressed, companded, or both amplitude values.

The decoder system 150 then processes the candidate reconstructed data item using the measurement neural network 120. The measurement neural network 120 is a neural network that has parameters (referred to as "measurement parameters") and that is configured to process the candidate reconstructed data item in accordance with current values of the measurement parameters to generate a measurement of the candidate reconstructed data item, i.e., to map the candidate reconstructed data item to a measurement that has the same dimensionality as the input measurement of the input data item.

The measurement neural network 120 can have any appropriate architecture that allows the neural network to map an input in the latent representation space to an output that has the same dimensionality as the data item. For example, when the data items are images, the measurement neural network 120, can be a convolutional neural network that maps the reconstructed data item to an output tensor that has the dimensionality of the measurement. As another example, when the data items are images, the measurement neural network 120 can be a multi-layer perceptron (MLP) that maps a sequence of intensity values from the reconstructed data item to an output tensor that has the dimensionality of the measurement. As another example, when the data items are audio data, the measurement neural network 120 can be a convolutional neural network with one-dimensional convolutions or an MLP that maps a sequence of amplitude values or a sequence of compressed, companded, or both amplitude values to an output tensor that has the appropriate dimensionality.

The decoder system 150 then updates the latent representation to reduce an error between the measurement of the candidate reconstructed data item and the input measurement of the input data item, e.g., by performing a gradient descent step with respect to the latent representation on the error.

After the one or more optimization steps have been performed, the decoder system 150 processes the latent representation after the one or more optimization steps using the generator neural network 110 to generate the reconstruction 152 of the data item 102.

In some implementations, the system 100, the system 150, or another training system has trained the generator neural network 110 and the measurement neural network 120 jointly to determine the current values of the generator parameters and the measurement parameters. In particular, the system has trained the generator neural network 110 and the measurement neural network 120 jointly on a set of training data item using meta-learning by, for each training data item, back-propagating through the one or more optimization steps to improve the quality of the generated reconstruction of the training data item. This training is described in more detail below with reference to FIG. 3.

While this description describes using a measurement neural network 120 that has been trained jointly with the generator neural network 110, in some implementations the measurement neural network 120 is replaced with either 1) a measurement neural network that has not been trained jointly, i.e., a pre-trained neural network or 2) a function that is not a neural network, i.e., a different function that maps from the input data item space to the measurement space. For example, the measurement function can be a linear projection that has a random projection matrix or a projection matrix that is learned as described above for the parameters of the measurement neural network 120, i.e., also learned jointly with the training of the generator neural network 110.

Additionally, the above description describes the compressed sensing scheme as being used for compressing and reconstructing data items. The scheme can instead be used for conditional or unconditional data item generation. In the unconditional data item generation implementations, the measurement is a single value that encodes whether the input data item was generated by the generator neural network or is a real data item. The techniques described above can then be used to generate a new data item that appears to be a real data item when the measurement encodes that the input data item is real. In the conditional data item generation implementations, the measurement can include, for each of a plurality of classes, a score representing a likelihood that the input data item belongs to the class (and, optionally, an additional class that indicates the data item is a synthetic data item generated by the generator neural network). The techniques described above can then be used to generate a data item that reflects the distribution over classes that is defined by the measurement.

Figure 2:
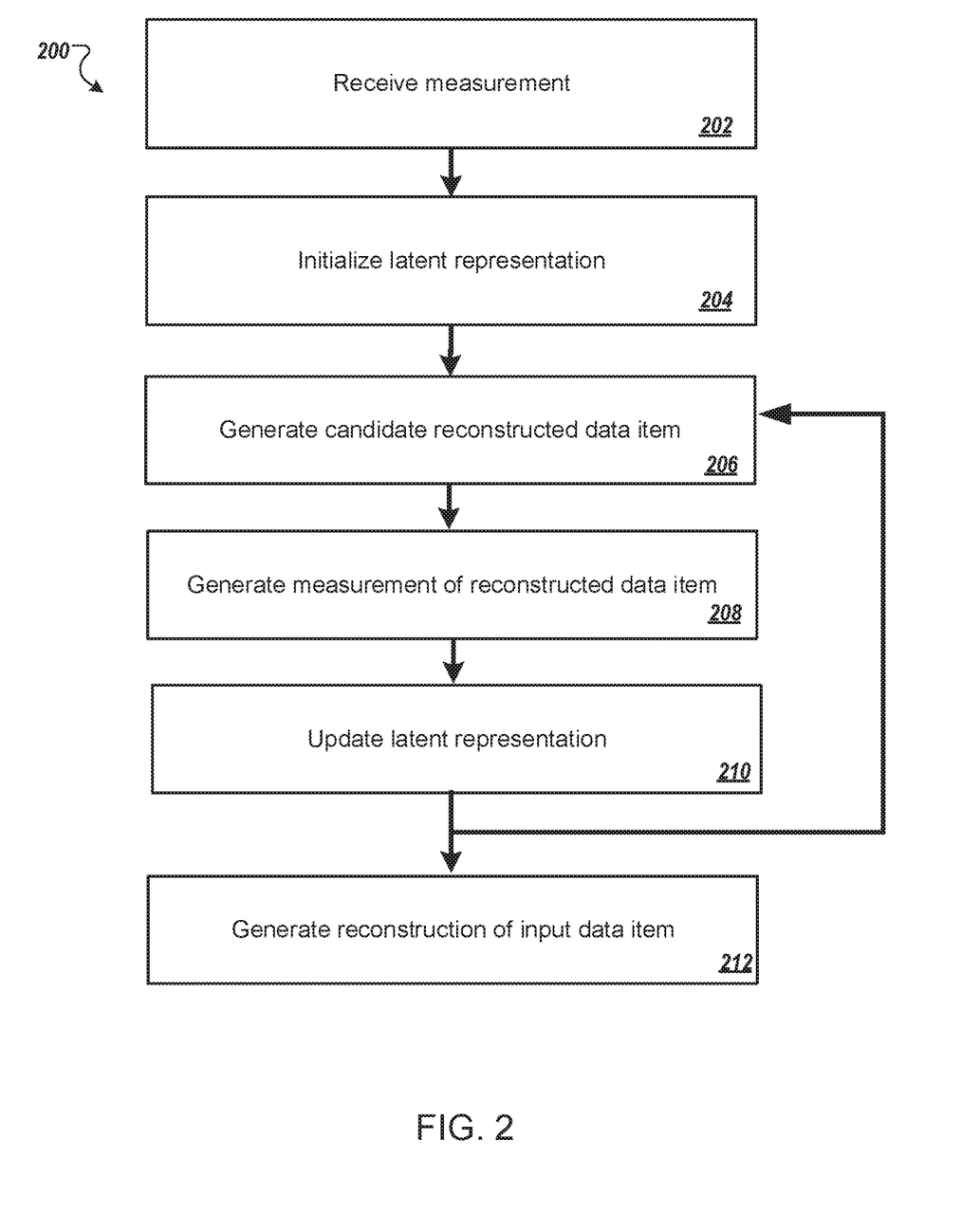
FIG. 2 is a flow diagram of an example process for generating a reconstruction of a data item.

FIG. 2 is a flow diagram of an example process 200 for generating a reconstruction of a data item. For convenience, the process 200 will be described as being performed by a system of one or more computers located in one or more locations. For example, a decoder system, e.g., the decoder system 150 of FIG. 1, appropriately programmed, can perform the process 200.

The system receives a measurement of the data item (step 202). The input measurement of the input data item is a representation of at least one characteristic of the input data item and has a lower dimensionality than the input data item. More specifically, the measurement was generated by an encoder system by processing the data item using the measurement neural network.

The system initializes a latent representation (step 204). For example, the system can initialize the latent representation randomly, i.e., by randomly sampling a tensor from a predetermined probability distribution over the latent representation space.

The system performs one or more optimization steps in order to update the latent representation. Generally, the number of optimization steps is fixed. For example, the system may have determined the number of optimization steps to perform based on how many steps were required to generate high quality reconstructions of training items during training of the generator and measurement neural networks. As another example, the system may determine the number of optimization steps to perform based on the amount of computational resources allocated to the reconstruction process or the latency budget available for generating the reconstruction.

At each optimization step, the system performs steps 206-210 of the process 200.

The system processes the latent representation using the generator neural network to generate a candidate reconstructed data item (step 206).

The system processes the candidate reconstructed data item using the measurement neural network to generate a measurement of the candidate reconstructed data item (step 208).

The system updates the latent representation to reduce an error between the measurement of the candidate reconstructed data item and the input measurement of the input data item (step 210). In particular, the system performs a gradient descent step with respect to the latent representation on the error. The error can be, for example, the square of the Euclidean distance between the two measurements.

To perform the gradient descent step, in some implementations the system computes a gradient with respect to the latent representation of the error and subtracts the update from the latent representation to determine an updated latent representation. In some other implementations, the system applies a learning rate to the gradient to determine an update, and then subtracts the update from the latent representation to determine an updated latent representation. The learning rate can be fixed or can be treated as a parameter and learned during the training of the generator and measurement neural networks.

In some implementations, the system normalizes the updated latent representation after every gradient descent step.

Because the optimization is performed in the space of the latent representation (rather than in the space of the data item itself) and the latent representations are significantly lower dimensionality than the input data items, each optimization step can be performed in a computationally efficient manner.

After performing the one or more optimization steps, the system processes the latent representation after the one or more optimization steps using the generator neural network and in accordance with the current values of the generator parameters to generate a reconstruction of the input data item (step 212).

Figure 3:
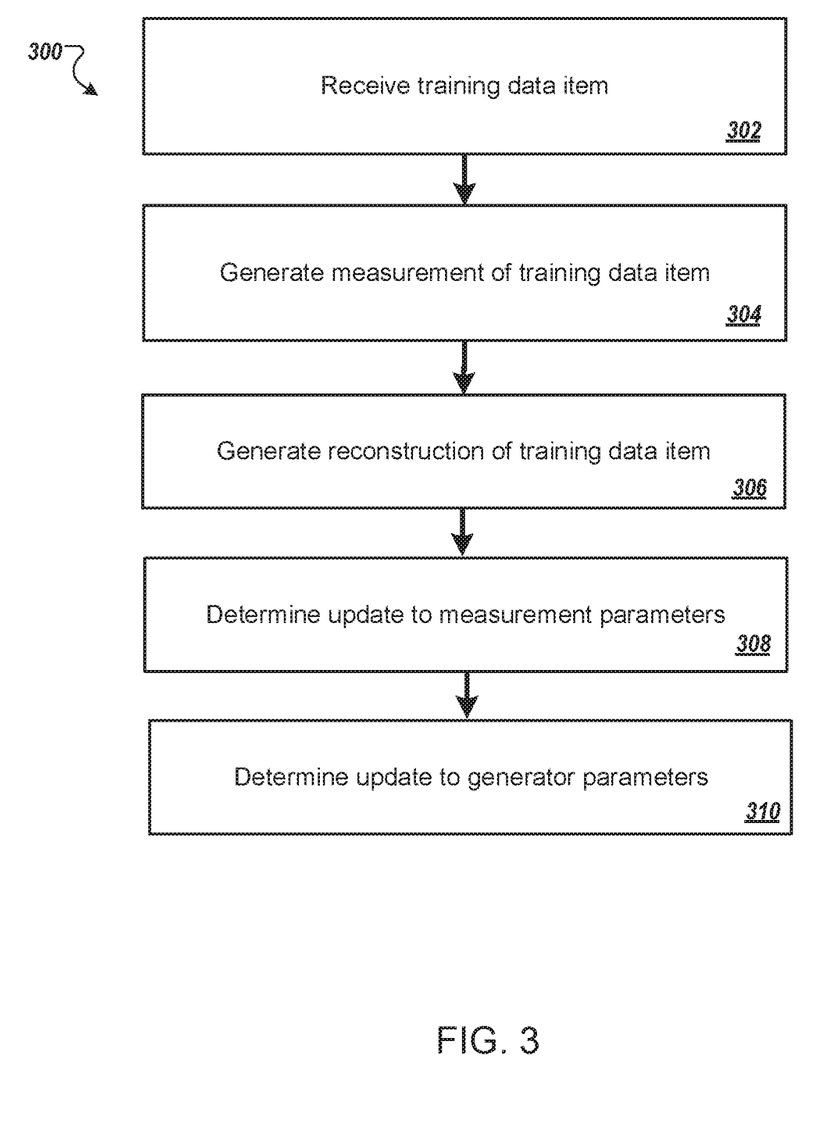
FIG. 3 is a flow diagram of an example process for training the generator and measurement neural networks.

FIG. 3 is a flow diagram of an example process 300 for training the measurement neural network and the generator neural network. For convenience, the process 300 will be described as being performed by a system of one or more computers located in one or more locations. For example, a training system, e.g., the encoder system 100 or the decoder system 150 of FIG. 1, appropriately programmed, can perform the process 300.

The system can repeatedly perform the process 300 on different training items selected from a set of training data to jointly train the measurement and generator neural networks.

The system receives a training data item (step 302).

The system generates a measurement of the training data item by processing the data item using the measurement neural network and in accordance with the current values of the measurement parameters (step 304).

The system generates a reconstruction of the training data item in accordance with the current values of the measurement parameters and current values of the generator parameters (step 306), i.e., as described above with reference to FIG. 2.

The system determines an update to the current values of the measurement parameters (step 308). In particular, the system determines the update by determining a gradient with respect to the measurement parameters of a measurement loss function.

The measurement loss function measures, for a pair of data items, a difference between: (i) a norm of a measurement of the difference between the two data items in the pair and (ii) a norm of the difference between the two data items in the pair. For example, the measurement loss can be the square of the difference between the two norms. The system can use any appropriate norm, e.g., a Euclidean norm, when computing the measurement loss.

In particular, the measurement loss can satisfy:

$$E_{x_1, x_2}[(\|F_\varphi(x_1-x_2)\|_2 - \|x_1-x_2\|_2)^2],$$

where E is the expectation operator, $x_1$ and $x_2$ are a pair of data items, and $F_\varphi(x)$ is the output of the measurement neural network for a data item x.

The data items in the pair can be sampled in various ways. Generally, however, the data items for which the measurement loss is computed within a mini-batch include one or more training data items and one or more generated reconstructions. In some implementations, the system can select the training data item, the generated data item at the beginning of the optimization steps and the generated data item at the end of the optimization steps and then compute the average between the three pairs of losses between these three items points as a form of "triplet loss".

The system determines an update to the current values of the generator parameters (step 310).

In particular, the system determines the update by determining a gradient with respect to the generator parameters of a generator loss that includes at least a term that measures the error between the measurement of the reconstructed data item, i.e., as generated by the measurement neural network in accordance with the current values of the generator parameters and the input measurement of the input data item. In some implementations, the generator loss also includes a distance penalty term that penalizes the distance the latent representation moves over the optimization steps. For example, the distance penalty term can be the squared Euclidean distance between the initialized latent representation and the final latent representation after the optimization steps, weighted by a constant.

In some implementations, when computing the update to the generator parameters the system also computes the gradient of the measurement loss with respect to the generator parameters and computes the final update for the training data item as the sum or weighted sum of the two gradients.

Once the system has performed the process 300 for a mini-batch of training data items, the system applies the updates to the current values of the generator and measurement parameters, e.g., in accordance with the update rule employed by the optimizer used by the system in the training, e.g., the Adam optimizer or another gradient descent-based optimizer. For example, the system can average the respective updates for the training data items in the mini-batch and then apply the update rule employed by the optimizer to the averaged update to update the current values of the generator and measurement parameters.

In some cases, the system does not compute an update to the measurement parameters for each training data item in the mini-batch and instead, samples a fixed number of triplets, e.g., as described above, that each include one or more training data items in the mini-batch and one or more generated data items that were generated by the generator while computing the generator parameter updates for the mini-batch. The system then computes a measurement update for each triplet and applies the updates to the current values of the measurement parameters in accordance with the update rule employed by the optimizer.

The system repeats the process 300 for multiple mini-batches to determine trained values of the measurement and generator parameters.

As described above, the scheme described in this specification can also be used for generating rather than reconstructing data items. For data item generation, rather than jointly update the generator and the measurement neural networks during training, the system alternates between updating the generator neural network to improve the quality of the generated data items and updating the measurement neural network to more accurately discern between generated and real measurements.

Additionally, the system can replace the measurement loss with a different loss that causes the trained generator neural network to more accurately generate data items.

In particular, when the measurement is a single value that reflects the likelihood that the data item is real and not synthetic, the system can replace the measurement loss described above with a measurement loss that is a cross-entropy between an indicator function that indicates whether the data item is real and the probability generated by the measurement neural network for the data item.

When the measurement includes, for each of a plurality of classes, a score representing a likelihood that the input data item belongs to the class, the system can instead use as the measurement loss the cross-entropy between (i) an indicator function that identifies which class the input data item belongs to (and assigns a zero probability for all other classes) and (ii) the measurement for the input data item generated by the measurement neural network.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of reconstructing a compressed data item, the method comprising:

receiving an input measurement of an input data item, wherein the input measurement of the input data item is a representation of at least one characteristic of the input data item and wherein the input measurement has a lower dimensionality than the input data item;

initializing a latent representation, wherein the latent representation has a lower dimensionality than the input data item;

for each of one or more optimization steps:

processing the latent representation using a generator neural network having a plurality of generator parameters, wherein the generator neural network is configured to process the latent representation in accordance with current values of the generator parameters to generate a candidate reconstructed data item, processing the candidate reconstructed data item using a measurement neural network having a plurality of measurement parameters, wherein the measurement neural network is configured to process the candidate reconstructed data item in accordance with current values of the measurement parameters to generate a measurement of the candidate reconstructed data item that has the same dimensionality as the input measurement and has a lower dimensionality than the candidate reconstructed data item, and wherein the measurement neural network that generates the measurement of the candidate reconstructed data item has been trained jointly with the generator neural network that generates the candidate reconstructed data item, the joint training comprising training the measurement neural network on a loss that comprises a measurement loss function that measures, for each of one or more training data items, a difference between (i) a norm of a measurement, generated by the measurement neural network, of a difference between the training data item and a reconstruction of the training data item and (ii) a norm of a difference between the training data item and the reconstruction of the training data item; and updating the latent representation to reduce an error between the measurement of the candidate reconstructed data item generated by the measurement neural network and the input measurement of the input data item, wherein updating the latent representation to reduce the error comprises performing a gradient descent step with respect to the latent representation, and wherein performing the gradient descent step comprises computing a gradient with respect to the latent representation of the error between the measurement of the candidate reconstructed data item generated by the measurement neural network and the input measurement of the input data item; and processing the latent representation after the one or more optimization steps using the generator neural network and in accordance with the current values of the generator parameters to generate a reconstruction of the input data item.

2. The method of claim 1, wherein initializing the latent representation comprises randomly selecting a latent representation.

3. The method of claim 1, wherein the input measurement encodes a likelihood that the input data item has been generated by the generator neural network instead of being a real input data item.

4. The method of claim 1, wherein the input measurement comprises, for each of a plurality of classes, a score representing a likelihood that the input data item belongs to the class.

5. The method of claim 4, wherein the plurality of classes includes a class that includes only data items generated by the generator neural network.

6. The method of claim 1, wherein the input data item is a tensor having a first number of elements and wherein the input measurement is a tensor having a second, lower number of elements.

7. The method of claim 1, wherein the number of optimization steps in the one or more optimization steps is a fixed constant.

8. The method of claim 1, wherein the generator neural network and the measurement neural network have been trained jointly using meta-learning by back-propagating through the one or more optimization steps to determine the current values of the generator parameters and the measurement parameters.

9. The method of claim 1, further comprising:

determining an update to the current values of the generator parameters, comprising determining a gradient with respect to the generator parameters of an error between a measurement of the reconstructed data item and the input measurement of the input data item.

10. The method of claim 9, further comprising:

determining an update to the current values of the measurement parameters, comprising determining a gradient with respect to the measurement parameters of the measurement loss function.

11. The method of claim 1, wherein the input measurement of the input data item has been generated by processing the input data item using the measurement neural network and in accordance with the current values of the measurement parameters.

12. One or more non-transitory computer-readable storage media storing instructions that when executed by one or more computers cause the one or more computers to perform operations for reconstructing a compressed data item, the operations comprising:

receiving an input measurement of an input data item, wherein the input measurement of the input data item is a representation of at least one characteristic of the input data item and wherein the input measurement has a lower dimensionality than the input data item;

initializing a latent representation, wherein the latent representation has a lower dimensionality than the input data item;

for each of one or more optimization steps:
processing the latent representation using a generator neural network having a plurality of generator parameters, wherein the generator neural network is configured to process the latent representation in accordance with current values of the generator parameters to generate a candidate reconstructed data item,
processing the candidate reconstructed data item using a measurement neural network having a plurality of measurement parameters, wherein the measurement neural network is configured to process the candidate reconstructed data item in accordance with current values of the measurement parameters to generate a measurement of the candidate reconstructed data item that has the same dimensionality as the input measurement and has a lower dimensionality than the candidate reconstructed data item, and wherein the measurement neural network that generates the measurement of the candidate reconstructed data item has been trained jointly with the generator neural network that generates the candidate reconstructed data item, the joint training comprising training the measurement neural network on a loss that comprises a measurement loss function that measures, for each of one or more training data items, a difference between (i) a norm of a measurement, generated by the measurement neural network, of a difference between the training data item and a reconstruction of the training data item and (ii) a norm of a difference between the training data item and the reconstruction of the training data item; and
updating the latent representation to reduce an error between the measurement of the candidate reconstructed data item generated by the measurement neural network and the input measurement of the input data item, wherein updating the latent representation to reduce the error comprises performing a gradient descent step with respect to the latent representation, and wherein performing the gradient descent step comprises computing a gradient with respect to the latent representation of the error between the measurement of the candidate reconstructed data item generated by the measurement neural network and the input measurement of the input data item; and
processing the latent representation after the one or more optimization steps using the generator neural network and in accordance with the current values of the generator parameters to generate a reconstruction of the input data item.

13. A system comprising one or more computers and one or more storage devices storing instructions that when executed by one or more computers cause the one or more computers to perform operations for reconstructing a compressed data item, the operations comprising:
receiving an input measurement of an input data item, wherein the input measurement of the input data item is a representation of at least one characteristic of the input data item and wherein the input measurement has a lower dimensionality than the input data item;
initializing a latent representation, wherein the latent representation has a lower dimensionality than the input data item;
for each of one or more optimization steps:
processing the latent representation using a generator neural network having a plurality of generator parameters, wherein the generator neural network is configured to process the latent representation in accordance with current values of the generator parameters to generate a candidate reconstructed data item,
processing the candidate reconstructed data item using a measurement neural network having a plurality of measurement parameters, wherein the measurement neural network is configured to process the candidate reconstructed data item in accordance with current values of the measurement parameters to generate a measurement of the candidate reconstructed data item that has the same dimensionality as the input measurement and has a lower dimensionality than the candidate reconstructed data item, and wherein the measurement neural network that generates the measurement of the candidate reconstructed data item has been trained jointly with the generator neural network that generates the candidate reconstructed data item, the joint training comprising training the measurement neural network on a loss that comprises a measurement loss function that measures, for each of one or more training data items, a difference between (i) a norm of a measurement, generated by the measurement neural network, of a difference between the training data item and a reconstruction of the training data item and (ii) a norm of a difference between the training data item and the reconstruction of the training data item; and
updating the latent representation to reduce an error between the measurement of the candidate reconstructed data item generated by the measurement neural network and the input measurement of the input data item, wherein updating the latent representation to reduce the error comprises performing a gradient descent step with respect to the latent representation, and wherein performing the gradient descent step comprises computing a gradient with respect to the latent representation of the error between the measurement of the candidate reconstructed data item generated by the measurement neural network and the input measurement of the input data item; and
processing the latent representation after the one or more optimization steps using the generator neural network and in accordance with the current values of the generator parameters to generate a reconstruction of the input data item.

14. The system of claim 13, wherein initializing the latent representation comprises randomly selecting a latent representation.

15. The system of claim 13, wherein the input measurement encodes a likelihood that the input data item has been generated by the generator neural network instead of being a real input data item.

16. The system of claim 13, wherein the input measurement comprises, for each of a plurality of classes, a score representing a likelihood that the input data item belongs to the class.

17. The system of claim 16, wherein the plurality of classes includes a class that includes only data items generated by the generator neural network.

18. The system of claim 13, wherein the input data item is a tensor having a first number of elements and wherein the input measurement is a tensor having a second, lower number of elements.

19. The system of claim 13, wherein the number of optimization steps in the one or more optimization steps is a fixed constant.

20. The system of claim 13, wherein updating the latent representation to reduce an error between the measurement of the candidate reconstructed data item and the input measurement of the input data item comprises:
performing a gradient descent step with respect to the latent representation on the error.

21. The system of claim 13, wherein the generator neural network and the measurement neural network have been trained jointly using meta-learning by back-propagating through the one or more optimization steps to determine the current values of the generator parameters and the measurement parameters.

22. The system of claim 13, the operations further comprising:
determining an update to the current values of the generator parameters, comprising determining a gradient with respect to the generator parameters of an error between a measurement of the reconstructed data item and the input measurement of the input data item.

23. The system of claim 22, the operations further comprising:
determining an update to the current values of the measurement parameters, comprising determining a gradient with respect to the measurement parameters of a measurement loss function.

24. The system of claim 23, wherein the measurement loss measures, for a pair of data items, a difference between: (i) a norm of a measurement of a difference between the two data items in the pair and (ii) a norm of the difference between the two data items in the pair.

25. The system of claim 13, wherein the input measurement of the input data item has been generated by processing the input data item using the measurement neural network and in accordance with the current values of the measurement parameters.

* * * * *